April 2, 1940.   J. A. EVANS   2,195,513
CULTIVATOR
Filed Aug. 24, 1939   2 Sheets-Sheet 1
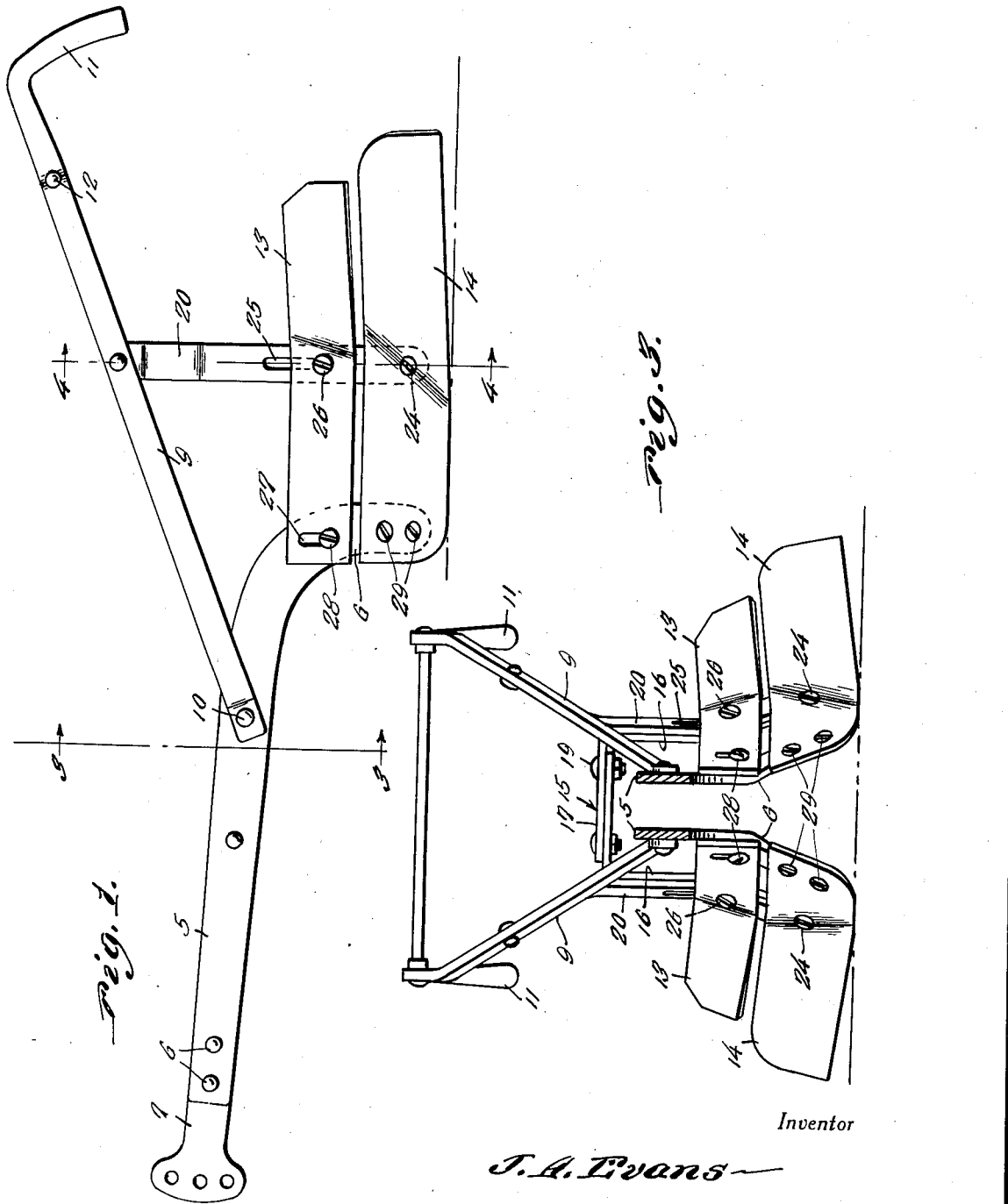
Inventor
J. A. Evans
By Clarence A O'Brien
and Hyman Berman
Attorneys April 2, 1940.   J. A. EVANS   2,195,513
CULTIVATOR
Filed Aug. 24, 1939   2 Sheets-Sheet 2
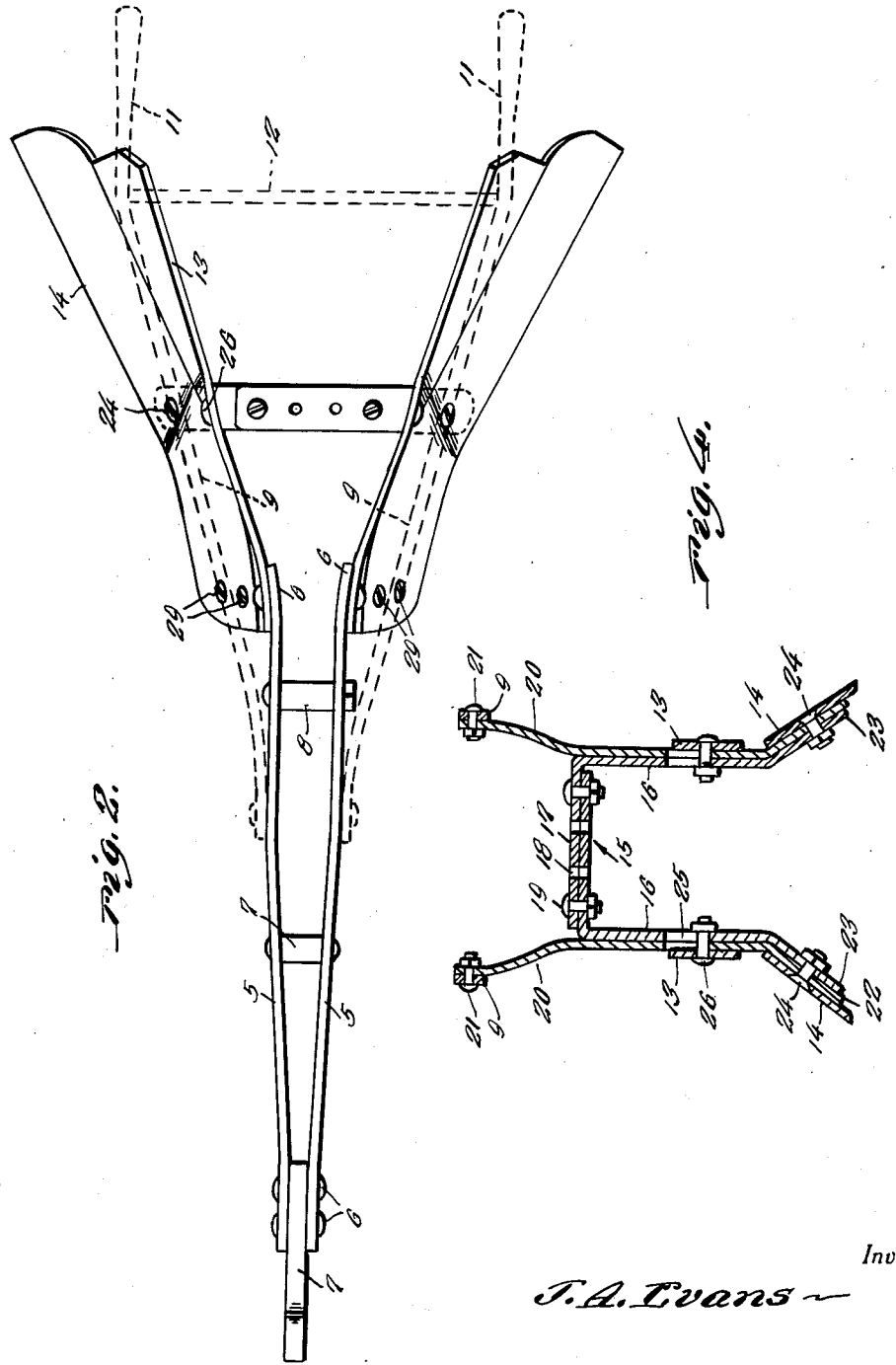
Inventor
J. A. Evans
By Clarence A. O'Brien
and Hyman Berman
Attorneys Patented Apr. 2, 1940

2,195,513

UNITED STATES PATENT OFFICE 2,195,513

CULTIVATOR

Joe A. Evans, Heflin, Ala.

Application August 24, 1939, Serial No. 291,781

2 Claims. (Cl. 97—168)

This invention appertains to new and useful improvements in cultivators of the row straddling type.

The principal object of the present invention is to provide a cultivator of the row straddling type which in use will leave each side of the row in a beveled shape preventing the young crop from falling.

Another important object of the invention is to provide a cultivator of the character stated wherein the blades can be adjusted for various characters of operation.

Another important object of the invention is to provide a cultivator which is of very simple construction and therefore of low cost to manufacture.

These and various other important objects and advantages of the invention will become apparent to the reader of the following specification.

In the drawings:

Figure 1 represents a side elevational view.

Figure 2 is a top plan view.

Figure 3 is a cross sectional view on the line 3—3 of Figure 1.

Figure 4 is a vertical transverse sectional view on the line 4—4 of Figure 1.

Referring to the drawings wherein like numerals designate like parts, it can be seen that a pair of beam bars 5—5 have their forward ends secured by bolts 6 to the apertured coupling plate 7. The rear portions of these beams 5 which curve downwardly to define tail members 6 are held spread apart by spacers 7 and 8.

Handle bars 9—9 are secured at their forward ends by bolts 10 to the intermediate portions of the beams 5 and terminate at their rear ends in handles 11. A brace rod 12 can span the rear end portions of the bars 9 to properly maintain the same spaced.

On each side of the cultivator is the upper blade 13 and the lower blade 14.

As shown in Figure 4, a sectional frame 15 is employed with the blades 13 and 14. This frame 15 includes a pair of side members 16—16 each of which has an inturned upper end portion 17 and these end portions interlap and have openings 18 through which securing members such as bolts 19 extend. Thus the width of the frame 15 can be readily determined.

Strap members 20—20 extend downwardly from the hand bars 9, the same being secured to the hand bars 9 by bolts 21 and have outwardly diverged lower foot portions 22 against which the outer diverged foot portions 23 of the side members 16 of the frame 15 bear. These foot members 23—22 have registering openings through which bolts 24 are disposed for securing the lower blades 14 properly in position. The intermediate portions of the side members 16 and the straps 20 are formed with slots 25. The upper blades 13 are secured in place by bolts 26 disposed through the registering slots 25 and obviously by loosening these bolts the upper blades 13 can be raised and lowered to the desired position to regulate the earth against which they must ride.

The forward ends of the blades 13 have vertical slots 27 and bolts 28 extend through these slots and through a corresponding opening in the tail portion 6. Bolts 29 secure the forward ends of the blade 14 to the corresponding tail portion 6 as is clearly shown in Figure 1.

Thus it can be seen that the blades 13 and 14 can be regulated as desired to perform specifically as regards the earth control necessary.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A cultivator comprising a beam, a pair of handle bars extending rearwardly from the beam, said beam having downwardly disposed tail members, a frame structure supported by the hand bars, and blade members bridging the tail portion and frame, said blades being arranged one above the other at each side of the frame.

2. A cultivator comprising a beam, a pair of handle bars extending rearwardly from the beam, said beam having downwardly disposed tail members, a frame structure supported by the hand bars, and blade members bridging the tail portion and frame, said blades being arranged one above the other at each side of the frame, with the lowermost blade diverged downwardly in an outboard direction.

JOE A. EVANS.